United States Patent [19]

Pulyer et al.

[11] Patent Number: 4,985,691
[45] Date of Patent: Jan. 15, 1991

[54] CONTACTLESS MOTION SENSOR

[75] Inventors: Yuly M. Pulyer, Farmingham, Mass.; Marlin H. Mickle, Pittsburgh, Pa.

[73] Assignee: University of Pittsburgh, Pittsburgh, Pa.

[21] Appl. No.: 257,150

[22] Filed: Oct. 11, 1988

Related U.S. Application Data

[63] Continuation of Ser. No. 834,086, Feb. 26, 1986, abandoned.

[51] Int. Cl.$^5$ ............................................. H01F 21/06
[52] U.S. Cl. ...................................... 336/130; 336/180
[58] Field of Search ...................... 336/75, 77, 79, 117, 336/118, 119, 120, 123, 130, 134, 132, 135, 208, 180; 324/208; 323/348, 347

[56] References Cited

U.S. PATENT DOCUMENTS

| | | | |
|---|---|---|---|
| 2,334,584 | 11/1943 | Rich | 336/208 X |
| 2,494,493 | 1/1950 | Schaevitz | 336/130 |
| 2,650,352 | 8/1953 | Ghilds | 336/123 |
| 2,671,892 | 3/1954 | Childs | 340/195 |
| 2,685,070 | 7/1954 | Childs | 336/123 |
| 2,756,357 | 7/1956 | Schaberg | 336/130 X |
| 2,799,835 | 7/1957 | Tripp et al. | 336/123 |
| 2,844,802 | 7/1958 | Tripp et al. | 336/123 |
| 2,849,668 | 8/1958 | Tripp | 318/28 |
| 2,867,783 | 1/1959 | Childs | 336/123 |
| 2,900,612 | 8/1959 | Tripp | 336/123 |
| 2,915,721 | 12/1959 | Farrand et al. | 336/69 |
| 2,921,280 | 1/1960 | Litwin et al. | 336/120 |
| 2,964,721 | 12/1960 | Tripp | 336/30 |
| 3,045,196 | 7/1962 | Packard | 336/135 |
| 3,090,933 | 5/1963 | Henry-Baudot | 336/79 X |
| 3,128,044 | 4/1964 | Packard | 336/120 X |
| 3,148,347 | 9/1964 | Morrison | 336/123 |
| 3,202,948 | 8/1965 | Farrand | 336/115 |
| 3,281,746 | 7/1966 | Buntschuh | 336/123 |
| 3,332,144 | 7/1967 | Bantschun et al. | 20/592 |
| 3,368,142 | 2/1968 | Bouchard et al. | 336/135 |
| 3,431,525 | 3/1969 | Buntschuh et al. | 336/123 |
| 3,441,888 | 4/1969 | Farrand | 336/123 |
| 3,491,321 | 1/1970 | Chass | 336/130 |
| 3,568,119 | 3/1971 | Ruderman | 336/135 |
| 3,573,693 | 4/1971 | Chess | 336/135 |
| 3,596,222 | 7/1971 | Pagella | 336/129 |
| 3,610,029 | 10/1971 | Carlson | 336/130 X |
| 3,611,813 | 10/1971 | Brocker | 73/51 |
| 3,758,845 | 9/1973 | MacKelvie et al. | 323/51 |
| 3,772,587 | 11/1973 | Farrand et al. | 323/46 |
| 3,812,481 | 5/1974 | Stedtnitz | 336/79 X |
| 3,882,436 | 5/1975 | Chass | 336/130 X |
| 4,255,682 | 3/1981 | Toida et al. | 336/135 X |
| 4,345,230 | 8/1982 | Chass | 336/135 |
| 4,425,511 | 1/1984 | Brosh | 336/79 X |
| 4,445,103 | 4/1984 | Chass | 336/130 X |
| 4,463,333 | 7/1984 | Ruhle | 336/115 |
| 4,507,638 | 3/1985 | Brosh | 336/79 |
| 4,663,589 | 5/1987 | Fiori Jr. | 324/208 |
| 4,777,436 | 10/1988 | Fiori Jr. | 336/79 X |

FOREIGN PATENT DOCUMENTS

1174079  3/1959  France .

Primary Examiner—Thomas J. Kozma
Attorney, Agent, or Firm—Nils H. Ljungman & Associates

[57] ABSTRACT

A motion and position sensor includes a stationary member having active conductors that carry energizing power and sensing conductors that are electromagnetically coupled by a movable member to generate signals in the sensing conductors that are representative of the position of the movable member. The movable member is contactless and therefore requires no electrical connection to any other component. Thus, frictional reactance torque and electromagnetically generated torque are reduced to a minimum.

10 Claims, 8 Drawing Sheets

CONTACTLESS MOTION SENSOR

This is continuation of co-pending application Ser. No. 834,086, now abandoned, filed on Feb. 26, 1986.

BACKGROUND OF THE INVENTION

1. Field of the Invention

The present invention relates to motion sensors and, more particularly, to a motion sensor having a movable member that requires no electrical connections.

2. Description of the Prior Art

Motion sensors are commonly used in high precision systems to monitor the linear or rotary movement of an object with respect to another object. For example, position and velocity sensors are commonly used by control systems that control the operation of robots and aircraft tracking systems. Also, position sensors are commonly used with gyroscopes that are employed by aircraft guidance systems.

Several concerns must be addressed when choosing a motion sensor for use in a high precision system. The information produced by the motion sensor should be in a form that is useful to those components of the system that receive it. Systems currently employed commonly use a general purpose computer or a microprocessor to coordinate the flow of information and to process the information. Therefore, it is highly desirable that the motion sensor produce information in digital form. Further, while most physical systems are designed or programmed to operate in a Cartesian coordinate system, many systems, such as robotic systems, operate and sense motion in polar, or other non-Cartesian, coordinate systems. The information produced by the system must be translated to Cartesian coordinates before it can be made useful. That is, the sensor of the system commonly produces an angle output, and the transcendental functions of the angle must be generated to resolve the vector representing the angle into its X-, Y- and Z- components.

Of further concern is the fact that a motion sensor that is employed by certain systems, such as gyroscope systems, should generate as little torque as is possible, since the torque generated by the sensor tends to degrade the performance of the system. A motion sensor can generate reactance torque in two ways. Both types of reactance torque are generated by a device that is commonly called an inductosyn, or a variable transformer sensor. An inductosyn is a mutually coupled magnetic device that employs a stationary member, or stator, and a movable member, or rotor, that is secured to and moved by the object whose motion is to be determined. Each member includes a conductor formed into a number of coils. The surfaces of the members that contain the coils confront each other and one set of coils is energized, thereby inducing an electrical current in the remaining set of coils. As the rotor moves, each coil of the energized conductor moves through positions in which it is located midway between adjacent coils of the nonenergized conductor, and in which the current induced in the nonenergized coils is a minimum, and in which each coil directly confronts a coil of the nonenergized conductor, in which the current provides an indication of the position of the rotor. However, when the coils of each conductor are not completely aligned, there exists a torque on the members that acts in a direction that tends to align the two sets of coils. Frictional torque is also generated by the apparatus of the inductosyn that is required to provide electrical communication between the system and the electrical conductors on the rotor and stator. Therefore, aside from its unsuitablility due to size and weight considerations, the inductosyn is unsuitable for gyroscope applications due to the level of torque it generates. Although inductosyns formed using thin film deposition techniques are smaller and lighter than conventional inductosyns, they still generate an unacceptably high level of torque for many applications requiring a high level of precision. Also, the contacting of the movable member by the current conductor, which is electrically connected to the stationary member of the device, generates undesirable electrical noise in the signal path.

The following United States Patents Nos. disclose motion sensors that either require electrical contact between a moving member and the system that receives information from the sensor, or that have two sets of coils that generate electromagnetic reactive torque as the sensor is operating:

| | | | |
|---|---|---|---|
| 2,650,352 | 2,867,783 | 3,148,347 | 3,441,888 |
| 2,671,892 | 2,900,612 | 3,202,948 | 3,596,222 |
| 2,685,070 | 2,915,721 | 3,281,746 | 3,758,845 |
| 2,799,835 | 2,921,280 | 3,332,144 | 3,772,587 |
| 2,844,802 | 2,964,721 | 3,431,525 | 4,463,333 |

U.S. Pat. No. 3,611,813 shows a tachometer consisting of two circular members, each of which includes a conductor forming an arcuately distorted generally periodic pattern. The conductor on the stator forms two balanced legs of a bridge which produce a zero output signal in the absence of the rotor. When the rotor is rotating proximate the stator, the impedance of the conductors on the stator changes and the rotor modulates the signal produced by the stator. The frequency of modulation increases with the speed of the rotor.

Accordingly, there exists the need for a motion sensor that reduces the amount of electromagnetic and frictional reactance torque that is produced by the sensor, that produces a signal in digital form, and that is particularly well-adapted to include circuitry for providing a signal that is relatively noise free, and that represents a function of the angular position of the rotor with respect to the stator.

SUMMARY OF THE INVENTION

The present invention provides apparatus for providing information pertaining to the position of an object. The apparatus includes a stationary member and a movable member. The stationary member includes a sensing electrical conductor and an active electrical conductor. The active electrical conductor is adapted to receive electrical power. The movable member has at least one element constructed at least partially of magnetic material. The magnetic element electromagnetically couples together the active and sensing conductors to induce an electric current in the sensing conductor when the active conductor receives electrical power. A characteristic of the induced current varies with the position of the movable member relative to the stationary member. Accordingly, the induced current conveys information pertaining to the movement or position of the movable member relative to the stationary member.

Preferably, the stationary member includes two active conductors separated spatially by a sensing conductor. The sensing conductor can include first segments that are closer to a first active conductor and second segments that are closer to the second active conductor. The first and second segments can be disposed alternately on the stationary member. Alternately, the active conductors can be separated spatially by two sensing conductors. The sensing conductors can be so disposed and configured that movement of the movable member induces in the sensing conductors a pair of periodic signals that are separated from each other by 90 electrical degrees.

Accordingly, the present invention provides a motion sensor that reduces the reactance torque it produces, since both the active and sensing conductors are on the same member, and that reduces the amount of frictional torque produced since electrical contact between the movable member of the sensor and the system that uses the sensor need not be made.

BRIEF DESCRIPTION OF THE DRAWINGS

The following detailed description of the preferred embodiments can be understood better if reference is made to the drawings, in which.

DETAILED DESCRIPTION OF THE PREFERRED EMBODIMENTS

Figure 1:
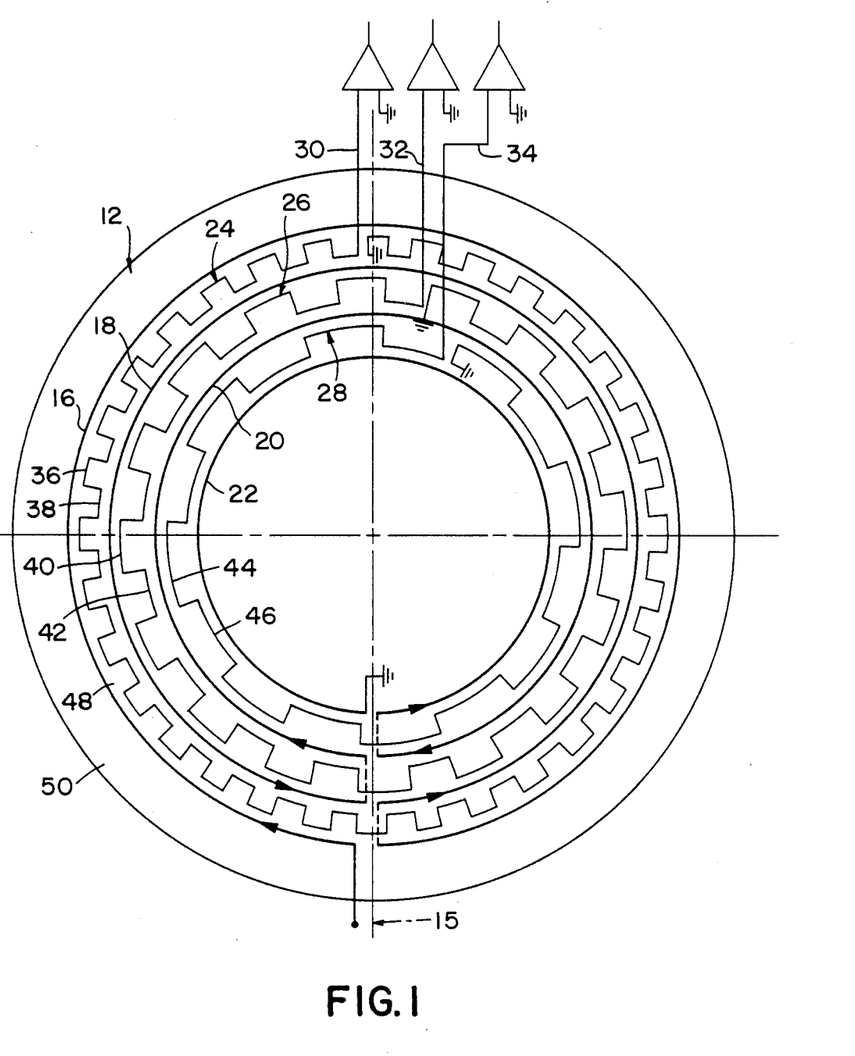
FIG. 1 shows the stationary member, or stator, of an angular sensor that can be constructed according to the teachings of the present invention.
Figure 2:
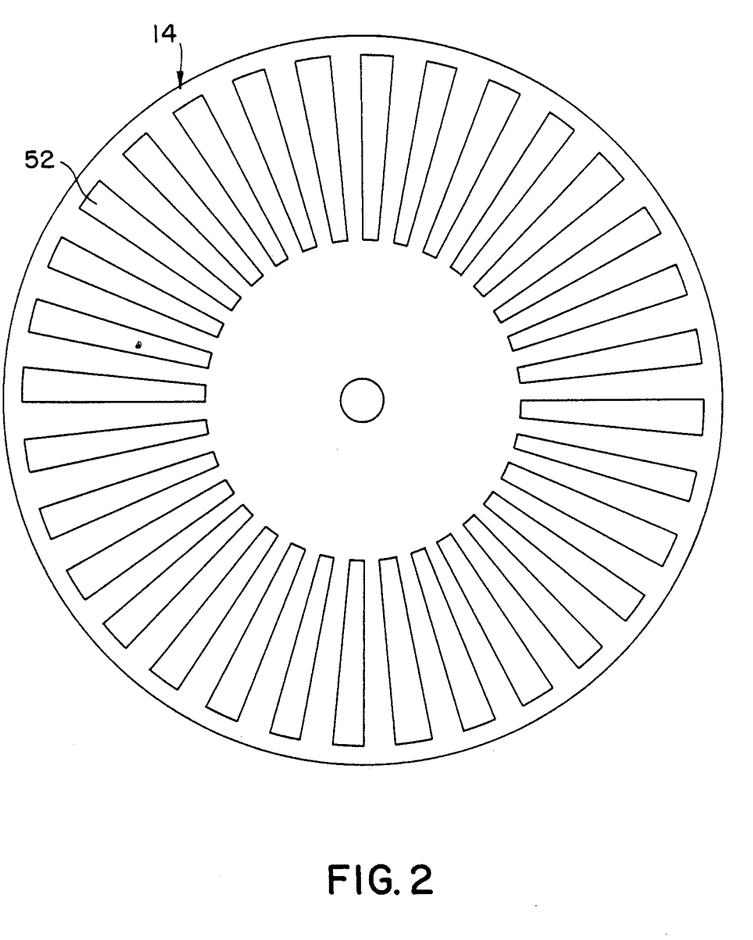
FIG. 2 is a plan view of the rotating member, or rotor, of the angular sensor.
Figure 3:
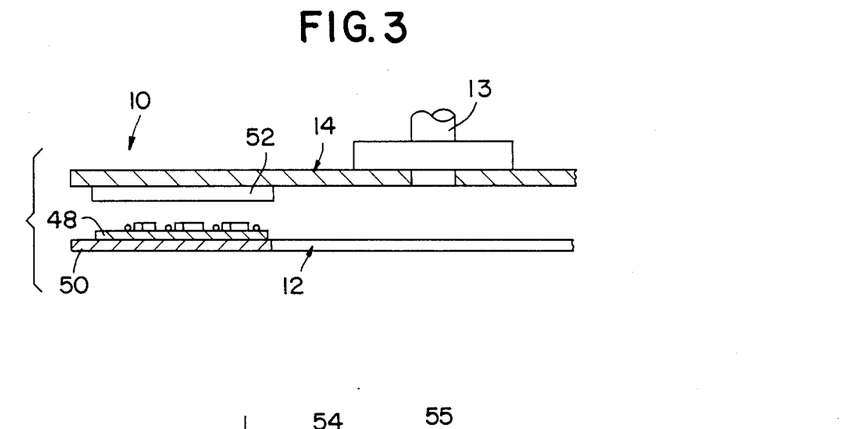
FIG. 3 is a side sectional view of a portion of the angular sensor formed by the rotor and stator shown in FIGS. 1 and 2.

FIGS. 1 through 3 show the preferred angular motion sensor 10 provided by the present invention. Sensor 10 can provide information pertaining to many motion characteristics, such as position, velocity and acceleration, along with functions, including transcendental, of those characteristics. Generally, sensor 10 includes a stator 12 and a rotor 14. Generally, stator 12 is mounted to a stationary object and rotor 14 is mechanically coupled by any suitable means (such as shaft 13) to the object whose rotary motion is to be monitored. The surfaces of rotor 14 and stator 12 shown in FIGS. 1 and 2 will confront each other with a suitable separation between them. Stator 12 includes a conductor 15 which is arranged on stator 12 to form, generally, multiple concentric transmission rings, for example, rings 16, 18, 20 and 22. It should be noted that electrically, conductor 15 forms transmission lines by placing the conductor on concentric circles and appropriately routing the conductor from one circle to the next to form the pattern shown in FIG. 1. Each concentric circle on which conductor 15 is placed is referred to as a ring. During the operation of sensor 10, conductor 15 receives electrical power from a source external to stator 12. Stator 12 also includes multiple sensing conductors, for example, conductors 24, 26 and 28. It should be noted that only three sensing conductors and four transmission rings are shown in FIG. 1 and discussed herein for the purpose of ease of illustration. The conductors and rings shown in FIG. 1 form only three bits of information, which is unsuitable for many applications of the present invention. For use in most systems, a sensor with more than 20 bits of information is desirable, which would require sensor 10 to have 23 conductors and 24 rings. Clearly, to make such a sensor 10, the diameter of members 12 and 14 should be increased to permit stator 12 to accomodate 23 conductors and 24 rings. Any desired number of bits can be provided by appropriately sizing stator 12 to accommodate a suitable number of conductors and rings.

During operation of sensor 10, rotor 14 induces a current in conductors 24, 26 and 28 from conductor 15. The current in conductors 24, 26 and 28 conveys information pertaining to the motion of rotor 14 relative to stator 12. The signals carried by conductors 24, 26 and 28 are produced at the output of sensor 10 along lines 30, 32 and 34, respectively. As can be seen in FIG. 1, each of conductors 24, 26 and 28 is formed into a square wave configuration. For example, conductor 24 includes first segments 36 that are proximate ring 16 and second segments 38 that are proximate ring 18. Conductor 26 includes first segments 40 that are proximate ring 18 and second segments 42 that are proximate ring 20. Conductor 28 includes first segments 44 that are proximate ring 20 and second segments 46 that are proximate ring 22. Base 48 of stator 12 can be formed from any suitable electrically insulating material. Support 50 of stator 12 similarly can be constructed of any suitable material.

Rotor 14 includes a number of strips 52 that are constructed from magnetic material. Each magnetic strip 52 extends radially from the center of rotor 14 across all seven conductors 16, 18, 20, 22, 24, 26 and 28. Accordingly, each strip 52 magnetically couples conductor 28 to rings 20 and 22, conductor 26 to rings 18 and 20, and conductor 24 to rings 16 and 18. Current is induced in conductors 24, 26 and 28 whenever periodically timevarying or alternating current is flowing through conductor 15.

Each sensing conductor 24, 26 and 28 is adjacent a pair of rings 16, 18, 20 and 22. For example, conductor 24 is adjacent rings 16 and 18. As rotor 14 rotates, each magnetic strip 52 alternately overlies the segments of each conductor 24, 26 and 28. For example, as rotor 14 rotates, each strip 52 alternately overlies outer segments 36 and inner segments 38 of conductor 24. Accordingly, each magnetic strip 52 alternately magnetically couples each conductor 24, 26 and 28 to one of its adjacent rings and to the remaining adjacent ring. Magnetic strips 52 are so arranged on rotor 14 that the position of all strips 52 relative to segments 36, 38, 40, 42, 44 and 46 is the same. Thus, at any given time, all strips 52 completely overlie a segment 36 or 38, or overlie partially both a segment 36 and a segment 38.

As a result, at any one time, a conductor 24, 26 or 28 can be considered to be coupled to its outer adjacent ring, thus having induced in it the signal carried on its outer ring, coupled wholly to its inner adjacent ring, thus carrying an induced current of the type carried by the inner adjacent ring, or, if strips 52 are arranged between segments, a composite signal that consists of a combination of the signals carried on the inner and outer adjacent rings. Therefore, the signals produced by stator 12 on lines 30, 32 and 34 are periodically changing signals each of which alternates between the form of the signal on an outer adjacent ring and the signal on an inner adjacent ring.

The precise form of the output appearing on lines 30, 32 and 34 depends on the form of the signal imposed on conductor 15. Preferably, a high frequency alternating voltage is imposed on line 15. Therefore, each ring 16, 18, 20, and 22 will carry an alternating current that is 180° out of phase with the current carried by each adjacent ring. Each conductor 24, 26 and 28 will be coupled by magnetic strips to one of its adjacent rings, unless magnetic strips 52 are disposed over the transition area between the inner and outer segments of a sensing conductor. If strips 52 are disposed over the outer segments of a conductor, that conductor carries an alternating current of a first phase. If strips 52 are disposed over the inner segments of a conductor, the conductor carries the current induced from the inner ring, which has a phase that is 180° separated from phase of the signal induced by the outer ring. If the strips are over the transition area between the inner and outer segments, the currents induced on the sensing conductor from the inner and outer adjacent rings essentially cancel each other. Therefore, the phase information corresponding to the current carried on a sensing conductor is of binary form and each conductor produces one bit of binary information. By adjusting the diameter of rotor 14 and stator 12 and by adjusting the length of strips 52, sensor 10 can be made to produce binary information of almost any bit length.

Figure 4:
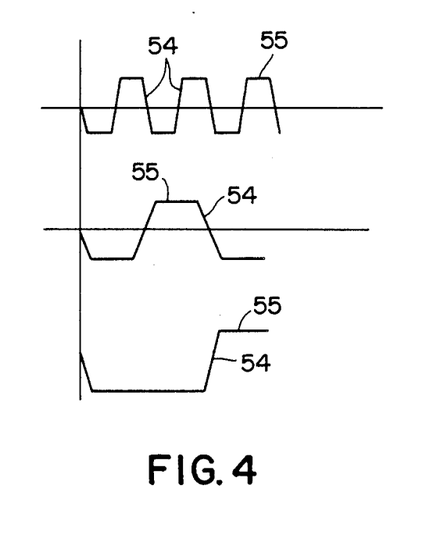
FIG. 4 is a graphical representation of the envelope of the electrical signals produced by the stator shown in FIG. 1.

Rotation of rotor 14 relative to stator 12 will cause a signal to be imposed on each of lines 30, 32 and 34 that alternates between two signals that are 180° out of phase with each other. When an alternating signal is imposed on line 15 that alternates with a frequency that is high with regard to the frequency of rotation of rotor 14 (for example, from one to 300 kHz), and rotor 14 is rotating at a constant velocity, the waveforms shown in FIG. 4 represent signals which amplitude modulate the high frequency signal imposed on line 15. Stated differently, the waveforms shown in FIG. 4 are the envelopes of the high frequency signals appearing on lines 30, 32 and 34 when rotor 14 rotates at a constant angular velocity.

Any suitable signal processing circuit can be provided for decoding the output of sensor 10. For example, the output of sensor 10 can be applied to a detector that produces the envelope of the output. The envelope, which is, essentially, a binary signal, can be applied to a level detector that decodes the envelope.

Further information pertaining to the position of rotor 14 with respect to stator 12 can be obtained when each strip 52 partially overlies inner and outer segments of a conductor. When a magnetic strip 52 travels from one segment of a conductor to another segment the strip must pass through a transition area where it partially overlies each of the two segments. The transition areas are shown as areas 54 in FIG. 4. Transition areas 54 reflect the fact that when a magnetic strip is travelling from one segment to another, there is a time period during which a conductor 24, 26 or 28 is magnetically coupled to both its inner and outer rings and the current induced on the conductor consists of a contribution from the signal present on each ring. Transition areas 54 can be used to increase the resolution of sensor 10. The level of the envelope of the signal produced by a sensing conductor in the transition area 54 depends on the size of the relative portions of the inner and outer segments overlain by strips 52. Any suitable level translating or slope detecting circuit can be employed to produce a signal representative of the level of the envelope. Accordingly, the position of rotor 14 with respect to stator 12 can be determined "between bits" when strips 52 are between segments of conductors 24, 26 and 28.

Sensor 10 decreases the electromagnetic reactance torque generated by placing both the active and passive conductors on the same member and by reducing the frictional reactance torque by eliminating the need for maintaining electrical communication with rotor 14. Sensor 10 also retains the advantage provided by inductosyns that the output produced by sensor 10 represents the average of the signals produced by a large number of strips 52 in the conductors. Therefore, the effects of any irregularities in manufacturing of rotor 14 and stators 12 of sensor 10 will be minimized.

It will be seen that the configuration of the sensing conductors shown in FIG. 1 permits sensor 10 to provide directly at its output information pertaining to the position of rotor 14 with respect to stator 12. Other motion characteristics along with functions of those characteristics can be provided by proper processing of the output. Alternately, any desired motion characteristic or function of a motion characteristic can be provided by changing the configuration and relative positions of the sensing conductors. For example, the sensing conductors shown in FIG. 1 provide a normal binary numerical sequence as rotor 14 rotates. However, proper arrangement of the convolutions of the sensing conductors would permit sensor 10 to directly produce on lines 30, 32 and 34 the sine of the position of rotor 14 or a grey code, as well as any other desired functions, as rotor 14 rotates.

Figure 9A:
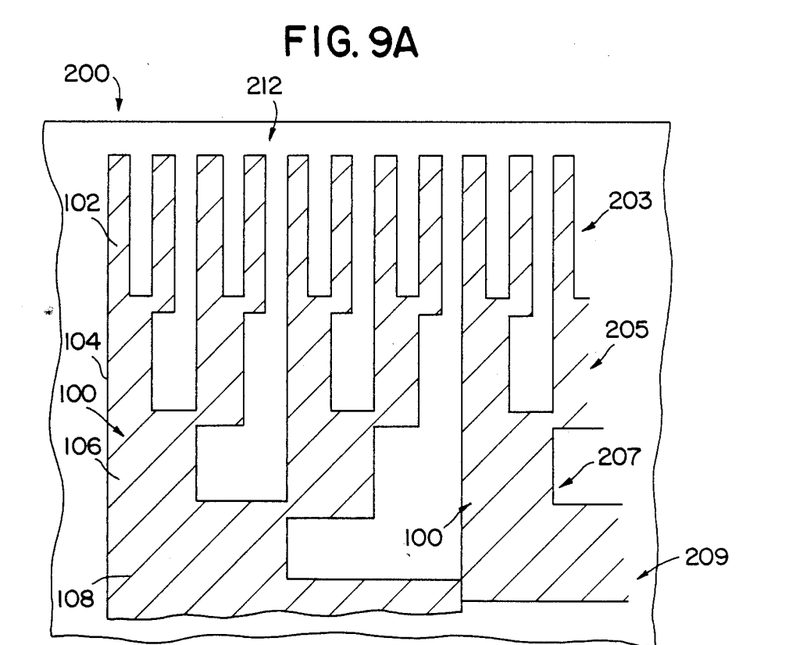
FIG. 9 shows a portion of an alternate embodiment that senses linear motion.
Figure 9B:
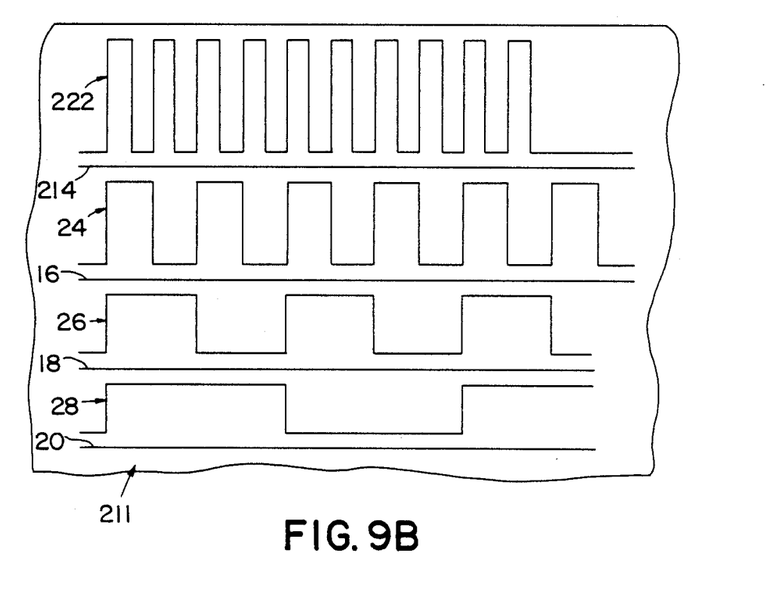

FIG. 9 shows an alternate construction for the magnetic members of rotor 212. Rotor 212 includes a number of members 100 (only one of which is shown in its entirety in FIG. 9) that are constructed from magnetic material. FIG. 9 further shows sensing conductors 24, 26 and 28 of stator 211 in the proper radial spatial relationship with magnetic members 100. A fourth sensing conductor 222 is shown, which forms the fourth bit shown in FIG. 9. Transmission rings 16, 18, 20 and 22 of stator 12 are also shown in FIG. 9 in proper spatial relationship with sensing conductors 24, 26, 28 and 222. Further, a fifth transmission ring 214 is shown, which, along with transmission ring 16 and sensing conductor 222 forms the fourth and least significant bit shown in FIG. 9. Each magnetic member 100 of rotor 212 defines a number of tiers, four of which are shown in FIG. 9. The number of tiers defined by each magnetic member 100 will depend on the number of bits that stator 211 will be required to produce. Magnetic member 100 should define one tier for each bit of information produced by sensor 200. Strips 102 form tier 203, strips 104 form tier 205, strips 106 form tier 207, and strips 108 form tier 209. Each strip 102 is adapted to couple lines 214 and 16 to sensing conductor 222. Each strip 104 is adapted to couple lines 16 and 18 to sensing conductor 24. Each strip 106 is adapted to couple lines 18 and 20 to sensing conductor 26. Each strip 108 is adapted to couple lines 20 and 22 to sensing conductor 28.

Unlike strips 52 shown in FIG. 1, the width of each strip comprising a magnetic member 100 is adapted to correspond to the width of the sensing conductor segments that the strip is adapted to overlie. The strips 52 shown in FIG. 1 induce in sensing conductors 24, 26 and 28 high frequency signals having the envelope shown in FIG. 4. The waveforms in FIG. 4 have flat peaks 55 and relatively steep transition areas 54, since strips 52 are narrower than the segments formed by sensing conductors 24, 26 and 28. As can be seen from FIG. 10, the envelope of the signals induced in the sensing conductors by the strips of each magnetic member 100 when rotor 212 is moving relative to stator 211 do not have flattened peaks since the width of each strip corresponds to the segment of the sensing conductors corresponding to the strip. Accordingly, the transition areas created by sensor 200 represent a greater proportion of the circumference of sensor 200 than that represented by the transistor areas generated by sensor 10, and more information about the position of rotor 212 "between bits" can be determined than can be determined from sensor 10.

The resolution of sensors 10 and 200 can be adjusted either by changing the number of sensing conductors and transmission rings formed on their stators to adjust the number of bits represented by the outputs of sensors 10 and 200 or by changing the number of segments in each sensing conductor. It should be noted that increasing only the number of segments formed by each sensing conductor increases resolution at the expense of reducing the determinability of sensors 10 and 200. That is, if the number of segments formed by a conductor is greater than $2^n$ (where n is the number of conductors between the conductor in question and the center of the stator, including the stator in question) the sensor will not produce a unique binary number for each stator position.

It should be noted that any number of known techniques can be used to fabricate sensors 10 and 200. Generally, any known thin film deposition technique used to fabricate integrated circuits would be suitable for fabricating sensors 10 and 200.

Figure 5:
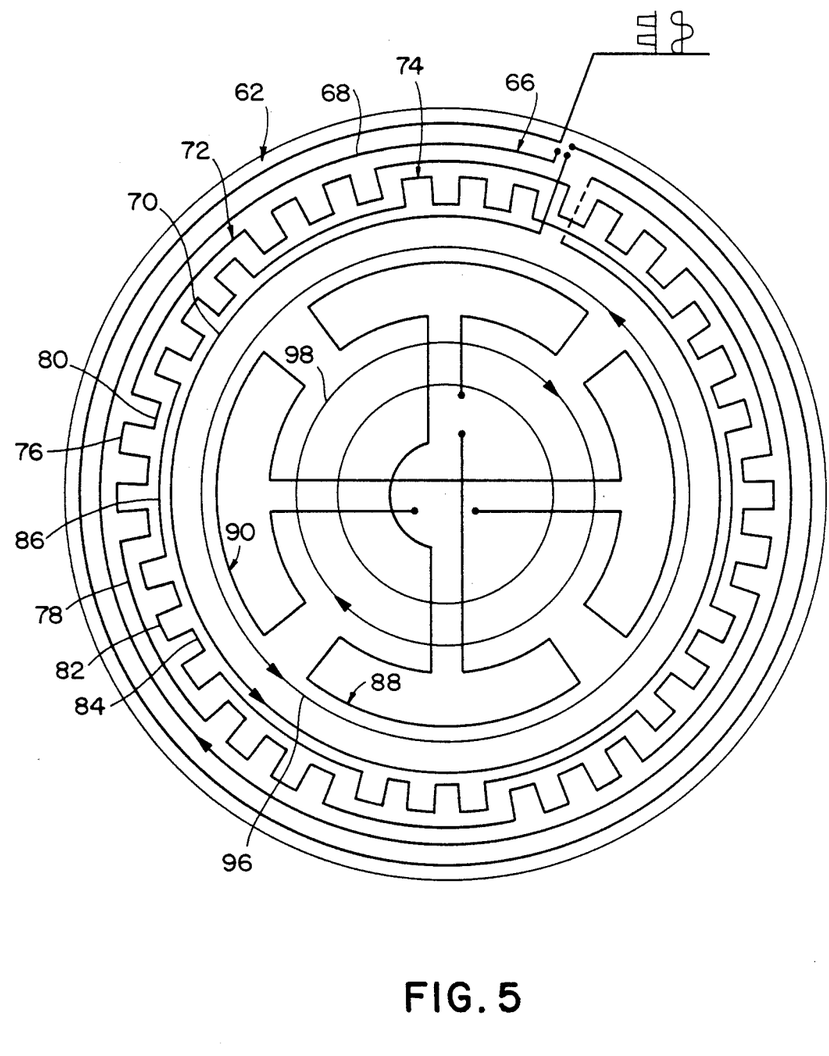
FIG. 5 is a plan view of the stator of an alternate angular sensor that can be constructed according to the teachings of the present invention.
Figure 6:
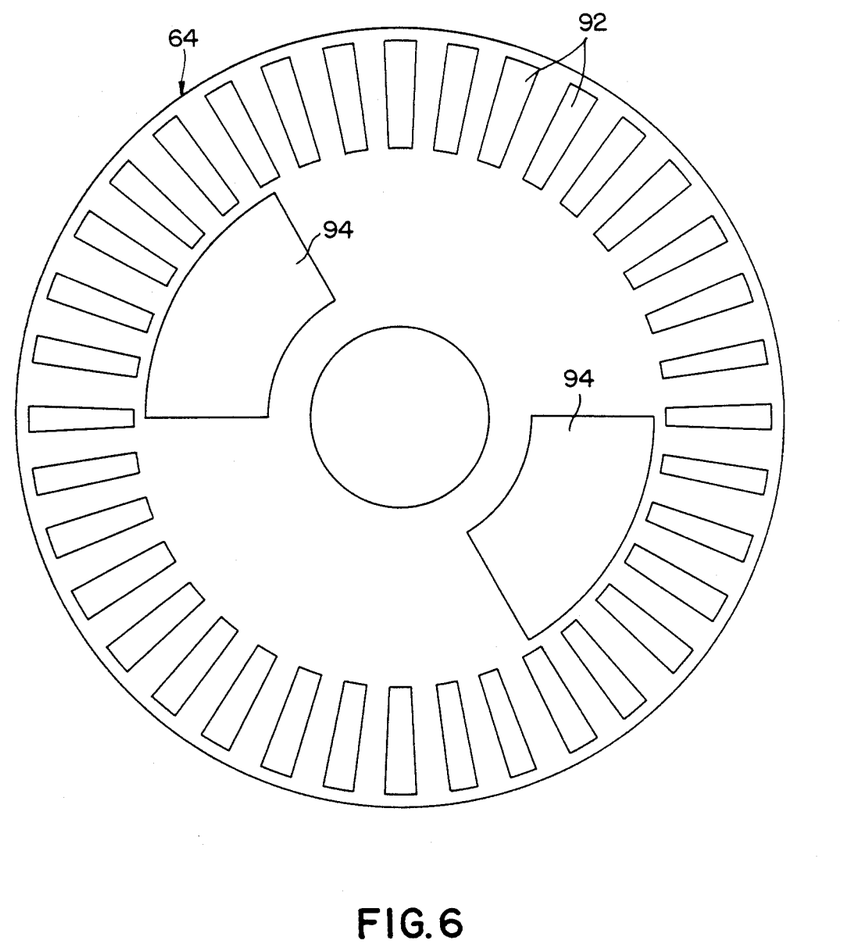
FIG. 6 is a plan view of the rotor of the alternate angular sensor.
Figure 7:
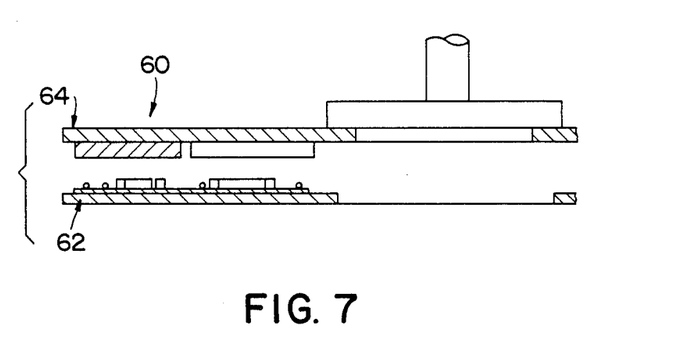
FIG. 7 is a side sectional view of a portion of the alternate sensor formed by the rotor and stator shown in FIGS. 5 and 6.

FIGS. 5 and 6 show an alternate sensor 60 that can be constructed according to the provisions of the present invention. Sensor 60 includes a stator 62 and a rotor 64. Although sensor 60 could be constructed to provide a unique binary number for each position of rotor 64, sensor 60 is best used to produce signals that can be detected to determine the position of rotor 64. Stator 62 includes a conductor 66 which forms an outer ring 68 and an inner ring 70. An outer passive sensing conductor 72 and an inner passive sensing conductor 74 separate rings 68 and 70. Outer conductor 72 defines short outer segments 76 and long outer segments 78 which are disposed proximate outer ring 68 and short inner segments 80 which are proximate inner ring 70. Inner sensing conductor 74 defines short outer segments 82 which are proximate outer ring 68 and long outer segments 78 of sensor conductor 72. Conductor 74 also defines short inner segments 84 which are proximate inner ring 70 of conductor 66, and long inner segments 86 which are proximate inner ring 70 and short inner segments 80 of outer sensing conductor 72. Stator 62 includes two further conductors 88 and 90 which are arranged on the central portion of stator 62. Each of conductors 88 and 90 forms a coil having two poles. Transmission rings 96 and 98 are separated by conductors 88 and 90 and are energized with a high frequency alternating signal.

Rotor 64 includes two sets of members constructed of magnetic material. Magnetic strips 92 extend radially along the periphery of rotor 64. Two magnetic surfaces 94 are arranged on the central portion of rotor 64 in diametrically opposing positions. Strips 92 are adapted to overlie conductors 66, 72 and 74 and to induce current in conductors 72 and 74 from conductor 66. Surfaces 94 are adapted to overlie and induce current in coils 88 and 90 from rings 96 and 98.

Outer segments 78 of sensing conductor 72 are always coupled by magnetic strips 92 to outer ring 68 of conductor 66. As rotor 64 rotates, each magnetic strip 92 alternately couples a segment 82 to outer ring 68 and a segment 80 to inner ring 70. Long inner segments 86 of conductor 74 are always coupled by magnetic strips 92 to inner ring 70 of conductor 66. As rotor 64 rotates, magnetic strips 92 alternately couple outer segments 82 to ring 68 and inner segments 84 to ring 70 to conductor 66. Accordingly, rotation of rotor 64 modulates high frequency periodic electrical signals causing the envelope shown in FIG. 8 to be induced in sensing conductors 72 and 74. Due to the arrangement of conductors 72 and 74 with respect to each other, the envelopes of the signals induced in conductors 72 and 74 are 90 electrical degrees out of phase with each other.

Figure 8A:
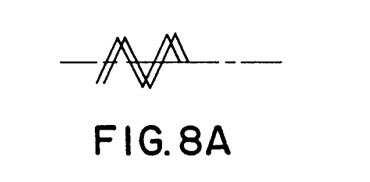
FIG. 8 is a graphical representation of the envelopes of the electrical signals produced by the stator of the alternate angular sensor.
Figure 8B:
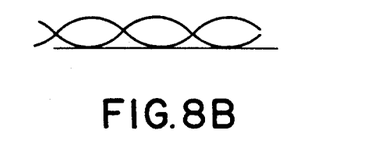

Any suitable circuit (not shown) can be used to decode the signals represented in FIG. 8. Preferably, however, a zero crossing detector, a threshold detector, and a slope detector are used to decode the signals. The threshold detector is the primary digital decoder. That is, the threshold detector provides the binary number represented by the output of sensor 60. The threshold detector determines when the envelopes produced by sensor 60 are greater than a high threshold and less than a low threshold. The threshold detector assigns a high binary value to the signal when the envelope exceeds the high threshold and a low binary value to the signal when the envelope is less than the low threshold Accordingly, the threshold detector provides a coarse indication of the relation position of rotor 64. The slope detector is an analog circuit that provides a fine determination of the relative position of rotor 64. The slope detector determines the rate of change of the envelope of the signals produced by sensor 60. Thus, the information provided by the slope detector can be used to provide additional information to determine more precisely the position of rotor 64 within the range of positions represented by each binary number produced by the threshold detector. The zero crossing detector is used both as a check on and in conjunction with the slope detector. The zero crossing detector produces an output each time the envelope shown in FIG. 8(a) crosses the zero axis or any desired reference axis. Two sensing conductors are used for each bit of information produced by sensor 60 to produce two envelope inputs to signal processing electronics, and thus increase the precision of sensor 60. As with sensors 10 and 200, and desired number of sensing conductor pairs can be provided to provide information of any desired bit size.

Due to the increased precision per sensing ring or conductor of the information produced by sensor 60 over that produced by sensors 10 and 200, sensor 60 is particularly useful in application where size restrictions prohibit adding the necessary sensing conductors to sensors 10 and 200 to achieve the desired resolution. That is, sensor 60 can provide the same resolution as that provided by sensors 10 and 200, but with fewer bits of information through a combination of digital and analog sensing. However, due to the analog circuitry that must be used with sensor 60 to achieve the desired resolution, sensor 60 will not be as repeatable as sensors 10 and 200.

Figures 10, 11, 12:
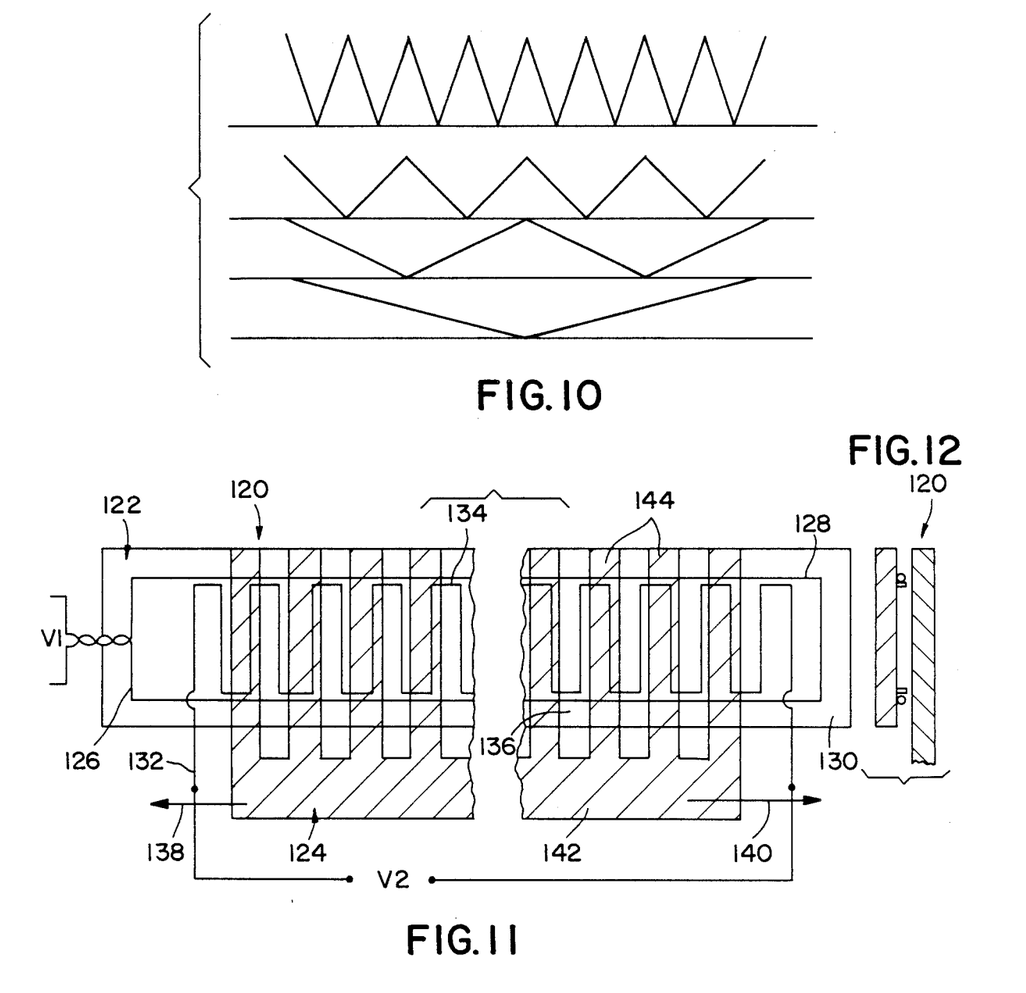
FIG. 10 shows in graphical form the envelopes of the electrical signals produced by a stator when it is used in conjunction with a rotor of the type shown in FIG. 9.
FIG. 11 shows a schematic representation of a linear velocity and acceleration sensor that can be constructed in accordance with the teachings of the present invention.
FIG. 12 is a side sectional view of the sensor shown in FIG. 11.

FIGS. 11 and 12 show an alternate embodiment of the present invention. Sensor 120 is a linear velocity or acceleration sensor. Sensor 120 includes a stationary member 122 and a movable member 124. Stationary member 122 includes an energizing conductor 126 that forms two transmission lines 128 and 130. Stationary member 122 also includes a sensing conductor 132 that forms a number of segments 134 and 136. Movable member 124 is adapted to move in the directions indicated by arrows 138 and 140 and includes a magnetic member 142. Magnetic member 142 defines a number of strips 144 which overlie transmission lines 128 and 130 and portions of conductor 132. As movable member 124 moves with respect to stationary member 122, each magnetic strip 144 alternately couples segments 134 and 136 to transmission line 128 and segments 136. Because sensor 120 senses and provides an indication of only velocity or acceleration, V1 shown in FIG. 11, can be either constant or time varying. If V1 is a constant voltage, movement of member 124 with respect to stationary member 122 will cause pulses of opposite polarity to be induced on sensing conductor 132 and a series of pulses will be produced at V2. If V1 is an alternating signal, that is, a carrier signal, a carrier signal will be produced at V2 that has an envelope generally of the form shown in FIG. 10. Regardless of the form of V1, V2 can be converted to a series of pulses using conventional circuitry and the pulses can be input to a frequency pulse modulator to provide information pertaining to the acceleration and speed of movable member 124. Of course, linear analogs to sensors 10, 60 and 200 can be easily produced by making suitable modifications to sensor 120.

Suitable circuits can be provided to sense and determine the variation in inductance created by the movable members of sensors 10, 60, 120 and 200 to determine position.

What is claimed is:

1. Apparatus for providing information pertaining to the position and motion of an object comprising:
   a stationary member; and
   a moveable member;
   said stationary member defining a generally planar first surface and including both a sensing conductor and an active electrical conductor, said sensing conductor and said active electrical conductor both being in generally planar configuration and disposed on said first surface;
   said active electrical conductor and said sensing conductor being electrically insulated from one another;
   said active electrical conductor being adapted to receive electrical power;
   said sensing conductor comprising at least a first and a second zigzag pattern;
   said active electrical conductor having a first portion, a second portion and a third portion, said first portion being disposed on a first side of said first zigzag pattern and said second portion being disposed on a second side of said first zigzag pattern opposite said first side of said first zigzag pattern;
   said first and second portions being connected so that instantaneous current flowing in said first portion is opposite to instantaneous current flowing in said second portion;
   said second portion being disposed on a first side of said second zigzag pattern and said third portion being disposed on a second side of said second zigzag pattern opposite said first side of said second zigzag pattern;
   said second and third portions being connected so that instantaneous current flowing in said second portion is opposite to instantaneous current flowing in said third portion;
   said movable member defining a generally planar second surface substantially parallel to said first surface;
   said movable member comprising plurality of radially disposed and separate elements constructed at least partially of magnetic material;
   said elements constructed at least partially of magnetic material electromagnetically coupling together said active conductor and said sensing conductor;
   said coupling having a level of coupling determined by at least one of the motion and position of said movable member relative to said stationary member;
   said elements constructed at least partially of magnetic material being positioned to overlie said sensing conductor and a portion of said active electrical conductor for inducing a signal in said sensing conductor when said active electrical conductor receives electrical power, such that said induced signal is of such magnitude which varies in relation to said level of coupling, whereby said induced signal conveys information pertaining to at least one of the position and motion of said moveable member relative to said stationary member.

2. The apparatus recited by claim 1 wherein said stationary member includes two said active conductors separated spatially by a said sensing conductor.

3. The apparatus recited by claim 2 wherein said sensing conductor includes first segments that are closer to a first said active conductor and second segments that are closer to the said second active conductor.

4. The apparatus recited by claim 3 wherein said first and second segments are disposed alternately on said stationary member.

5. The apparatus recited by claim 2 wherein said active conductors are separated spatially by two said sensing conductors.

6. The apparatus of claim 1, wherein said sensing conductor is concentrically positioned within said first active electrical conductor.

7. The apparatus of claim 6, wherein:
   said zigzag pattern defined by said sensing conductor further defines first portions of said sensing conductor and second portions of said sensing conductor; and
   said first portions of said sensing conductor are closer to said first active electrical conductor than said second portions.

8. The apparatus of claim 7, wherein said magnetic element is configured to confront said first active electrical conductor and to confront;
   one of said first portions of said sensing conductor;
   one of said second portions of said sensing conductor; and
   a part of one of said first portions of said sensing conductor and a part of one of said second portions.

9. The apparatus of claim 8, wherein:
   said stationary member exerts a reactance force on said moveable member; and
   said stationary member and said moveable member are configured to substantially minimize said reactance force.

10. The apparatus of claim 9, further including a second active electrical conductor positioned on said stationary member and concentrically within said sensing conductor.

* * * * *

UNITED STATES PATENT AND TRADEMARK OFFICE
CERTIFICATE OF CORRECTION

PATENT NO. : 4,985,691

DATED : January 15, 1991

INVENTOR(S) : Yuly M. Pulyer and Marlin H. Mickle

It is certified that error appears in the above-identified patent and that said Letters Patent is hereby corrected as shown below:

In column 7, line 27, after 'the', delete "transistor" and insert --transition--.

In column 8, line 47, after 'threshold', insert --.--.

In column 8, line 66, after '200,', delete "and" and insert --any--.

In column 9, line 4, after 'in', delete "application" and insert --applications--.

In Claim 8, line 3, after 'confront', delete ";" and insert --:--.

Signed and Sealed this

Seventh Day of July, 1992

*Attest:*

DOUGLAS B. COMER

*Attesting Officer*    Acting Commissioner of Patents and Trademarks